US005229600A

United States Patent [19]

Field, Jr.

[11] Patent Number: 5,229,600

[45] Date of Patent: Jul. 20, 1993

[54] EXPOSURE-COMPENSATION DEVICE FOR RECIPROCATING-FILTER TIME-MODULATED COLOR IMAGE INTENSIFIER

[75] Inventor: Robert J. Field, Jr., Fincastle, Va.

[73] Assignee: ITT Corporation, New York, N.Y.

[21] Appl. No.: 878,864

[22] Filed: May 5, 1992

[51] Int. Cl.[5] ........................ H01J 31/50; G01J 3/50; H04N 9/64

[52] U.S. Cl. ............................ 250/214 VT; 250/225; 250/226; 250/214 AG; 358/29; 358/42

[58] Field of Search ................ 250/213 VT, 207, 225, 250/226, 214 AG; 313/524; 358/29, 42

[56] References Cited

U.S. PATENT DOCUMENTS

| | | | |
|---|---|---|---|
| 2,389,039 | 11/1945 | Goldsmith | 358/42 |
| 3,812,526 | 5/1974 | Tan | 250/213 VT |
| 3,944,817 | 3/1976 | Hilsum et al. | 250/213 VT |
| 4,631,582 | 12/1986 | Nagasaki et al. | 358/42 |
| 4,724,354 | 2/1988 | Dill | 250/213 VT |
| 4,841,358 | 6/1989 | Kammoto et al. | 358/42 |
| 4,859,845 | 8/1989 | Sakano | 250/231.13 |
| 5,016,091 | 5/1991 | Choi | 358/29 |
| 5,046,162 | 9/1991 | Ishikawa et al. | 358/42 |
| 5,103,300 | 4/1992 | Nitta et al. | 358/42 |

OTHER PUBLICATIONS

Fischer, "Obtaining Color Pictures With An Image Intensifier Tube," RCA TN No. 556, Mar. 1964, pp. 1-2.

*Primary Examiner*—David C. Nelms
*Assistant Examiner*—Michael Messinger
*Attorney, Agent, or Firm*—Arthur L. Plevy; Patrick M. Hogan

[57] ABSTRACT

A color preserving image intensifier having synchronously reciprocating input and output multi-segmented, multi-color filter slides. To compensate for differences in exposure time of the segments of the filters arising from varying reciprocation velocity due, e.g. to sinusoidal motion, either the intensity of the output image is variably filtered or the intensifier gain is varied. In one embodiment, polarizing filters rotated in synchronicity with the reciprocation of the color preserving filters vary image intensity. In another embodiment, intensifier gain is varied based upon a velocity indicator.

11 Claims, 3 Drawing Sheets

EXPOSURE-COMPENSATION DEVICE FOR RECIPROCATING-FILTER TIME-MODULATED COLOR IMAGE INTENSIFIER

FIELD OF THE INVENTION

The present invention relates to color preserving image intensifier devices and methods for operating same and, more particularly, to devices and methods to compensate for unequal exposure times between filter elements, causing non-uniform color balance in time-modulated color image intensifiers which employ reciprocating filters.

BACKGROUND OF THE INVENTION

The time-modulated color image intensifier has been described in U.S. patent application Ser. No. 07/622,268 entitled COLOR IMAGE INTENSIFIER DEVICE, filed Feb. 28, 1991 by R. Jett Field, the inventor herein, and assigned to ITT Defense Technology Corporation, the assignee herein, which said patent application disclosure is incorporated by reference herein. As can be seen from application Ser. No. 07/622,268, the time-modulated color image intensifier contains a standard color-blind image intensifier with a white output phosphor. Two moving filters are added to convert this to a color-sensitive device. The first filter is at the input, and filters the incoming light to make the device sensitive to only one color at a time. The second filter is at the output, and filters the white phosphor light to produce only one color at a time. The two filters would typically contain three elements each, such as red, green, and blue. The filters are moved synchronously so that when the first input element is in place and the device is sensitive only to the first input color, the first output element is also in place and the output light is tinted by the first output color. The filters are moved rapidly enough so that the eye perceives a full color image without flicker. The input and output elements can be matched for true color reproduction, or mismatched for false color.

In the simplest configuration, the two filters are color wheels rotating on the same axis. Unfortunately, this increases the size of the overall image intensifier system since each wheel must be approximately twice the diameter of the intensifier tube. Furthermore, in the case where the intensifier tube employs a 180° image twister, the two wheels must be mounted on two different axles which further increases the size of the system.

In an alternate scheme shown in application Ser. No. 07/622,268, which is specially suited to compact systems, the filters can reciprocate on a linear track. In this case, the filter size may approximate the size of the intensifier tube, being only slightly larger than the image size. The filter elements are color stripes which may be narrower than the image size, so that different parts of the image are sensitive to different colors at any instant. Each of the three colors of elements should cover points on the image for equal times. In the simplest case, where each of the three elements has stripe width L, and the filter period is 3L, the filter could reciprocate distance 3L in a linear or "triangle wave" motion. Each image point is covered by the motion of three or four adjacent filter elements so that the exposure times of each of the three colors are equal. The overall length of the filter would be the image diameter+3L. If the intensifier tube employs a 180° twister, then the filters must move out of phase with one another. (Precise out-of-phase reciprocation is easily implemented by mounting the reciprocating drive wheels 180° apart on a common drive shaft).

The primary difficulty with the reciprocating scheme is in forcing the filters to move in a triangle wave motion. The simplest motion would be a sine wave as would result from the operation of a device like that shown in FIG. 1 of the present application, or a sinusoid wave as would result from the operation of a device like that shown in FIG. 2. FIG. 1 depicts a reciprocating filter bar 10 comprised of alternating color segments 12 of colors A, B and C which would actually be three primary colors, such as red, green and blue. The bar 10 is reciprocated on track 14 in direction x as depicted by double arrow 16 and passes in front of image intensifier input (and/or output) aperture 18. This reciprocating motion is accomplished via pin 20 riding in slot 22 of the bar 10. The pin 20 is rotated upon crank wheel 24.

FIG. 2 depicts a reciprocating arrangement like that shown in FIG. 1 but driven by connecting rod 26, connecting pin 20 and drive pin 28. In each of these cases, however, the three colors A, B and C would have unequal exposure times at each point on the image. For example, given sine wave motion with peak-to-peak motion range of 3L, and an image point which is covered by an element boundary at each extremum of this motion as in FIG. 3, such a point would be covered by the full width of three adjacent filter elements, but would be covered by the center element for a shorter time. As a result, images in this system would have uneven color balance in stripes with period 3L.

It is therefore an object of the present invention to provide a means for compensating for the non-uniform color exposure in a reciprocating-filter, time-modulated color image intensifier, such that more uniform color balance is achieved.

SUMMARY OF THE INVENTION

The problems and disadvantages associated with realizing color balance in reciprocating-filter, time-modulated color image intensifiers are overcome by the present invention which includes an image intensifier with an input and output. Reciprocal motion, multi-segmented multi-color input and output filters are positioned proximate the input and output, respectively, of the intensifier. There is a drive mechanism for actuating the filters. A compensator compensates for differences in exposure time for the colors of the input and output filter segments to provide color intensity balance to the output image.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

The color balance of any point in the image is determined by the relative exposure time of each color and the gain during the exposure. This dependence of the color balance on gain is the basis of this invention. Basically, the gain will be modulated such that the integral of gain during the exposure times are equal for each color. A compact time-modulated color image intensifier requires reciprocating motion of the input and output filters. To avoid a fixed pattern of non-uniform color balance, the filters must either be moved at constant velocity (which is difficult to implement), or the system gain must be modulated to compensate for the unequal exposure times. Three simple methods are described herein which compensate for exposure times of non-constant velocity filters, thereby eliminating non-uniform color balance. The intent is to reciprocate the filter over one color period (distance 3L), while making the gain proportional to the filter velocity. A normalized gain of 1.0 would be achieved at the maximum velocity. Thus, when the filter is moving quickly (giving short transition times of a filter element over an image point), a large gain would increase the signal. When the filter is moving slowly (giving long exposure time), a small gain would reduce the signal. (Note that a triangle wave motion, which has constant speed, would use constant gain. Note also that a rotating color wheel, which has constant velocity at any given point on the image, would also use constant gain.)

Three mechanisms are given here for modifying the gain during motion of the filters. The first involves mechanical movement of polarizing filters. The second modulates the intensifier tube gain using a signal derived from the reciprocating filter position. The third uses a fixed compensation filter.

Figure 1:
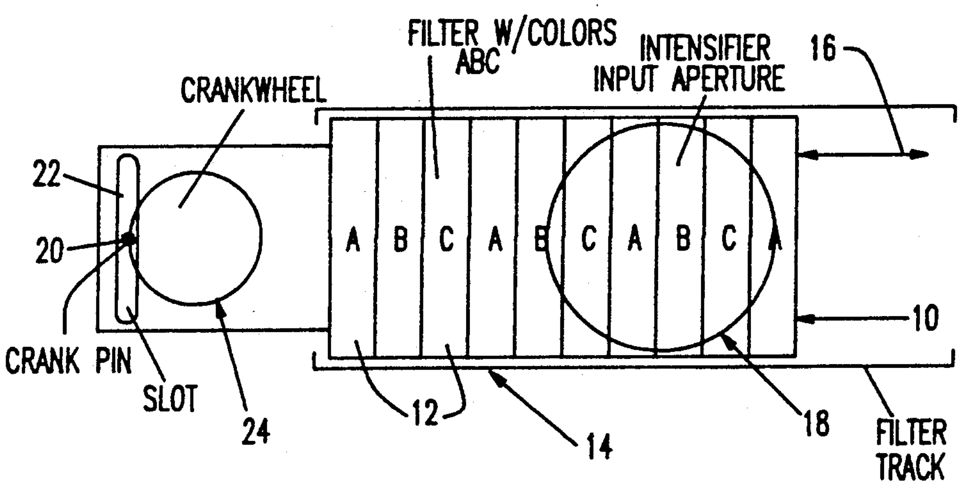
FIG. 1 is a diagrammatic front elevational view of a reciprocating filter with pin and slot drive mechanism.
Figure 2:
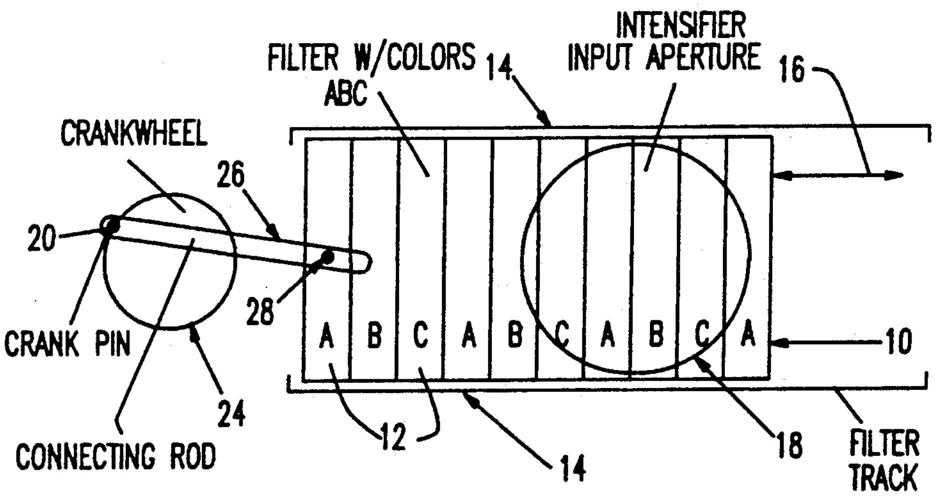
FIG. 2 is a diagrammatic front elevational view of a reciprocating filter crank and connecting rod drive mechanism.
Figure 4:
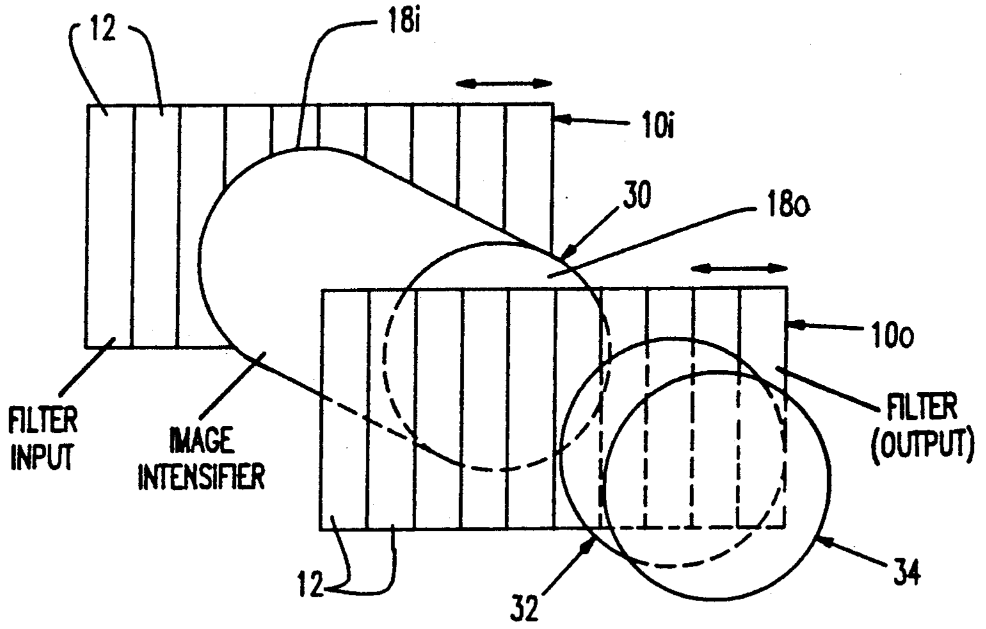
FIG. 4 is a diagrammatic perspective view of a compensation mechanism in accordance with a first exemplary embodiment of the present invention.

When the reciprocating motion is a sine wave, as in FIG. 1, the filter position is given by $x=1.5L \sin(wt)$ for a movement range of 3L. The velocity is then proportional to cos(wt). Thus, we need a normalized gain which varies as cos(wt) with a maximum of 1.0 at the maximum velocity ($x=0$) and zero gain at the endpoints of motion. This can be achieved using a pair of polarized filters 32, 34 (preferably located at the device output) as shown in FIG. 4. FIG. 4 shows a pair of reciprocating filter bars **10*i*, 10*o* with a plurality of alternating color segments 12 positioned at the input and output apertures 18*i*, 18*o* of an image intensifier tube 30. The drive mechanisms are not shown but would be similar to those depicted in FIGS. 1 and 2 and/or as described in U.S. patent application Ser. No. 07/622,268. One polarized filter 32 is fixed, while the second filter 34** rotates. The transmission through the pair of polarizers is proportional to cos(wt).

The rotating polarizing filter 34 is driven by conventional mechanical linkages to the same driving motor as that driving the filter bar 10, assuring constancy of the relationship between polarizing effect and color segment 12 exposure duration. It should also be observed that either polarizer 32, 34 could be fixed or rotated.

Figure 5:
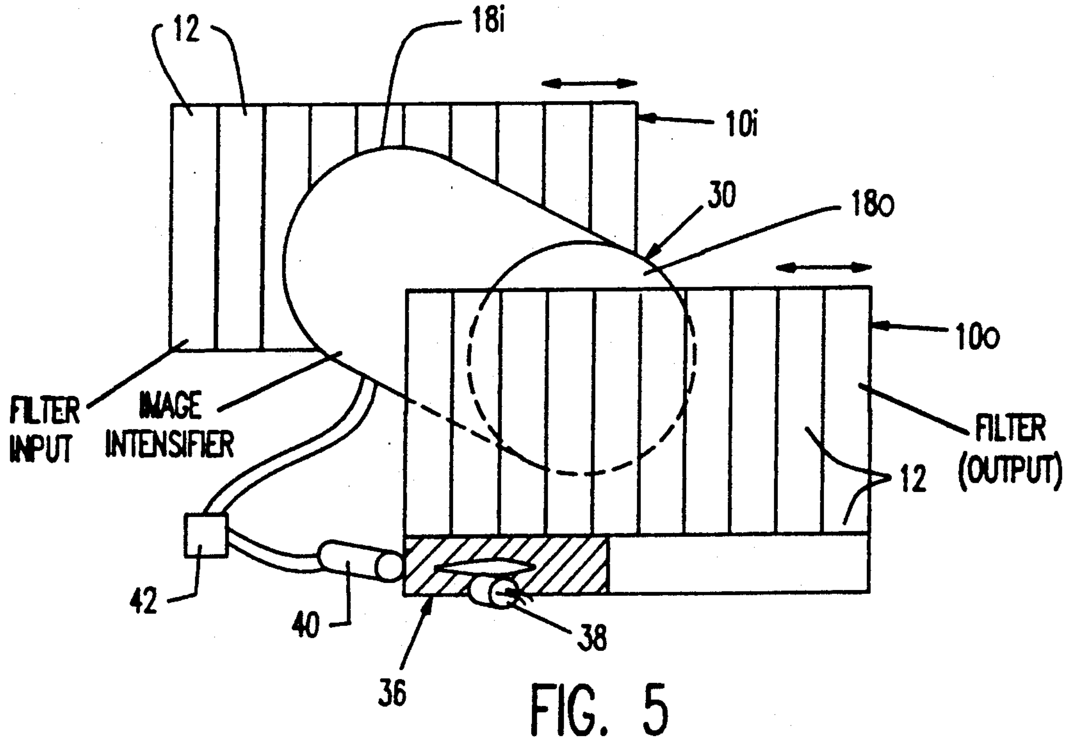
FIG. 5 is a diagrammatic perspective view of a light sensor-variable slot controlled compensation mechanism in accordance with a second exemplary embodiment of the present invention.

FIG. 5 shows another compensation mechanism in accordance with the present invention. The basic arrangement of intensifier 30 and filter bars **10*i*, 10*o* is similar to that shown in FIG. 4. However, in the device shown in FIG. 5, the gain is varied by directly controlling the intensifier gain with an electronic signal. As the filters 18*i*, 18*o* are moved, a signal is produced which is proportional to the absolute value of the velocity, and this signal controls the gain of the intensifier 30 over a normalized range from 0.0 to 1.0. The intensifier gain may be varied linearly by varying the duty cycle of the cathode-to-MCP voltage, or by other methods. The velocity signal can be encoded onto one of the reciprocating filters 18 in the form of a variable width transparent stripe 36** similar to that used to encode audio signals onto motion picture film.

A variety of equivalent means for encoding and decoding velocity/gain data for controlling the gain of the intensifier 30 exist, such as potentiometer, bar codes, magnetic tape, laser readable media, etc. and each expedient is intended to be comprehended within the scope of the present invention.

In the embodiment shown in FIG. 5, a constant emission light source (lamp) 38 provides the signal which is varied by the stripe 36. A detector 40, sensitive to the change in light intensity, encodes such variation in an electrical output to a signal conditioner 42 which converts detector signal to a gain control signal for the image intensifier 30. Note that this second method is adaptable to sinusoid motion as in FIG. 2 and other arbitrary motions.

Figure 3:
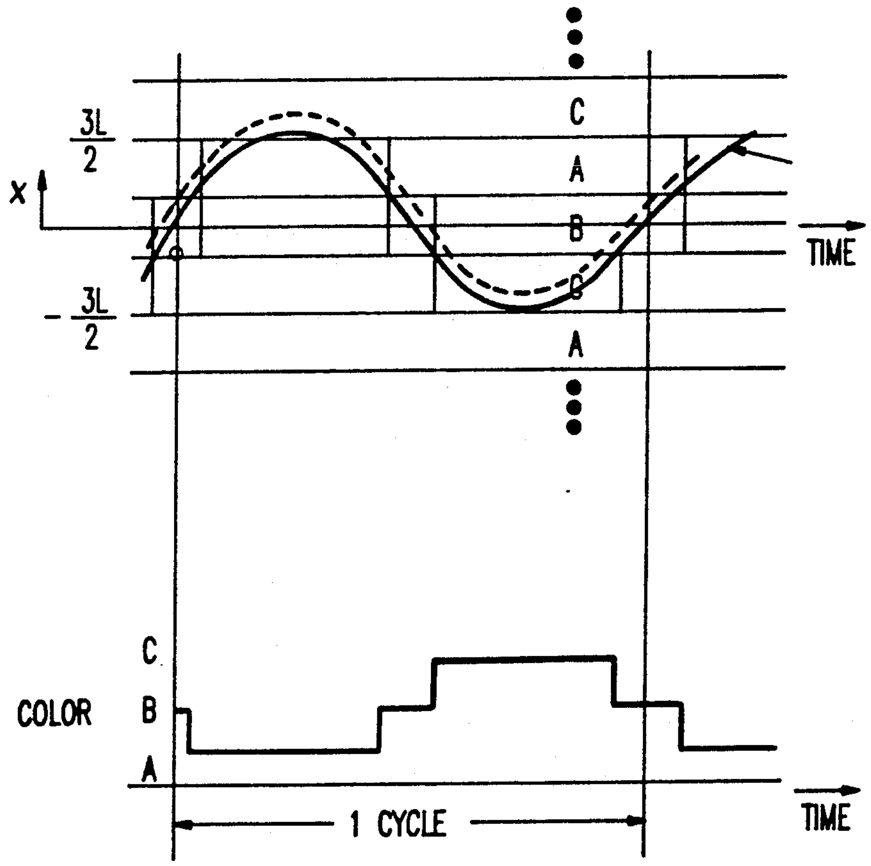
FIG. 3 is a graph and timing diagram showing motion in the x direction over time (t) for a reciprocating filter driven in sine motion and the duration of color A, B and C exposure for a selected sample image point.

A third mechanism to correct the color balance is a fixed compensation filter, preferably attached to the output of the system. From FIG. 3 it can be seen that the image point shown has overexposure of colors A and C. The compensation filter will be made so that the image point shown has reduced transmission of colors A and C, to give equal color balance at this point. Other image points have various other color balances, and so the compensation filter has suitable transmission of colors A, B and C at these other points, to bring all points on the image into the same color balance. Accordingly, the resulting fixed compensation filter has smoothly varying stripes.

It should be understood that the embodiments described herein are merely exemplary and that a person skilled in the art may make many variations and modifications without departing from the spirit and scope of the invention as defined in the appended claims.

I claim:

1. A color-preserving image intensifier comprises:
- an image intensifier having an input and output;
- a multi-segmented, multi-color input filter positioned proximate said input;
- a multi-segmented, multi-color output filter positioned proximate said output;
- drive means for reciprocating said input filter and said output filter rectilinearly in synchronicity, such that color composition of images entering said input filter and said intensifier is restored to an output image by said output filter; and
- means for compensating differences in exposure times for said colors of said multi-color input and output filters to provide color intensity balance to said output image.

2. The device of claim 1, wherein said compensating means is a light filter acting upon said output image to vary image brightness.

3. The device of claim 2, wherein said light filter is a polarizing filter system.

4. The device of claim 3, wherein said polarizing filter system includes a first polarizing filter which is stationary relative to said intensifier and a second polarizing filter which is rotatable with respect to said first polarizing filter.

5. A color-preserving image intensifier, comprises:

an image intensifier having an input and output;

a multi-segmented, multi-color input filter positioned proximate said input;

a multi-segmented, multi-color output filter positioned proximate said output;

drive means for reciprocating said input filter and said output filter in synchronicity, such that color composition of images entering said input filter and said intensifier is restored to an output image by said output filter; and a polarizing light filter system acting upon said output image to vary image brightness for compensating differences in exposure times for said colors of said multi-color input and output filters to provide color intensity balance to said output image, said polarizing filter system including a first polarizing filter which is stationary relative to said intensifier and a second polarizing filter which is rotatable with respect to said first polarizing filter in synchronicity with said reciprocation of said input and output filters to maintain a substantially constant color intensity throughout the range of motion of said input and output filters.

6. A color-preserving image intensifier, comprises:

an image intensifier having an input and output;

a multi-segmented, multi-color input filter positioned proximate said input;

a multi-segmented, multi-color output filter positioned proximate said output;

drive means for reciprocating said input filter and said output filter in synchronicity, such that color composition of images entering said input filter and said intensifier is restored to an output image by said output filter; and a light filter acting upon said output image to vary image brightness for compensating differences in exposure times for said colors of said multi-colored input and output filters to provide color intensity balance to said output image, said light filter being fixed and having graduated light pass characteristics over the surface thereof varying inversely to uncompensated output image brightness and color.

7. The device of claim 1, wherein said compensating means acts upon said intensifier by controlling the gain of said intensifier.

8. The device of claim 7, wherein said gain is controlled dependent upon the velocity of said input and output filters, the higher the velocity the larger the gain.

9. A color-preserving image intensifier, comprises:

an image intensifier having an input and output;

a multi-segmented, multi-color input filter positioned proximate said input;

a multi-segmented, multi-color output filter positioned proximate said output;

drive means for reciprocating said input filter and said output filter in synchronicity, such that color composition of images entering said input filter and said intensifier is restored to an output image by said output filter; and means for compensating differences in exposure times for said colors of said multi-color input and output filters to provide color intensity balance to said output image, said compensating means acting upon said intensifier by controlling the gain of said intensifier dependent upon the velocity of said input and output filters, the higher the velocity the larger the gain, said filter velocity being represented by an aperture of variable width in at least one of said input and output filters, said velocity representation being interpreted via a light sensor disposed on one side of said at least one filter proximate said aperture with a substantially constant source of light disposed opposite said sensor on the other side of said at least one filter such that when said at least one filter is reciprocated, said variable width aperture varies the light received by said sensor from said light source.

10. The device of claim 9, wherein said sensor generates a variable electrical signal based upon light intensity sensed by said sensor, said electrical signal being received by a signal conditioner which generates a control signal based thereon for controlling said intensifier gain.

11. A color-preserving image intensifier, comprises:

an image intensifier having an input and output;

a multi-segmented, multi-color input filter positioned proximate said input;

a multi-segmented, multi-color output filter positioned proximate said output;

drive means for reciprocating said input filter and said output filter in synchronicity, such that color composition of images entering said input filter and said intensifier is restored to an output image by said output filter; and means for compensating differences in exposure times for said colors of said multi-color input and output filters to provide color intensity balance to said output image, said compensating means acting upon said intensifier by controlling the gain of said intensifier dependent upon the velocity of said input and output filters, the higher the velocity the larger the gain, said filter velocity being encoded in a potentiometer which is mechanically driven by the filter drive mechanism, with signal from said potentiometer controlling intensifier gain, said signal being proportional to the filter velocity.

* * * * *